United States Patent Office 3,658,814
Patented Apr. 25, 1972

3,658,814
2-(ω-CHLOROALKYL)-6-ARYL SUBSTITUTED-4,5-DIHYDROPYRIDAZIN(2H)-3-ONE
William J. Houlihan, Mountain Lakes, N.J., assignor to Sandoz-Wander, Inc., Hanover, N.J.
No Drawing. Continuation-in-part of application Ser. No. 678,528, Oct. 27, 1967, now Patent No. 3,517,004, which is a continuation-in-part of application Ser. No. 566,719, July 21, 1966. This application Mar. 17, 1970, Ser. No. 20,435
Int. Cl. C07d 51/04
U.S. Cl. 260—250 A    1 Claim

ABSTRACT OF THE DISCLOSURE 2-(ω-chloroalkyl)-6-aryl or heterocyclic substituted-4,5-dihydropyridazin(2H)-3-ones, e.g., 2-(4-chlorobutyl)-6-(2-thienyl)-4,5-dihydropyridazin(2H)-3-ones, are prepared by chlorinating the condensation product formed by condensing ω-hydrazinoalkanols with aryl or heterocyclic-γ-ketobutyric acids and are useful as intermediates in preparing anti-depressants and analgesics.

---

This application is a continuation-in-part of copending application Ser. No. 678,528 filed Oct. 27, 1967 now U.S. Pat. No. 3,517,004, issued June 23, 1970, which in turn is a continuation-in-part of application Ser. No. 566,719 filed July 21, 1966 (now abandoned).

This invention relates to 4,5-dihydropyridazin(2H)-3-ones, and more particularly to certain ω-chloroalkyl-aryl or heterocyclic substituted-4,5-dihydropyridazin(2H)-3-ones, and to methods for their preparation.

The compounds of this invention may be represented by the following formula:

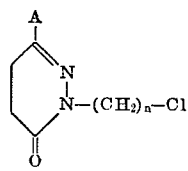

(I)

where $n$ is a whole integer of from 2 to 6; and
A represents

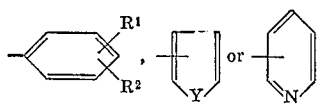

where each $R^1$ and $R^2$ independently represent hydrogen; halo having an atomic weight of from about 19 to 36; lower alkyl, i.e., alkyl having 1 to 4 carbon atoms, e.g., methyl, ethyl, etc.; lower alkoxy, i.e., alkoxy having 1 to 4 carbon atoms, e.g., methoxy, ethoxy, etc.; trifluoromethyl; or $R^1$ and $R^2$ together on adjacent carbon atoms represent methylenedioxy; and Y represents a sulfur or oxygen atom, provided that when both $R^1$ and $R^2$ represent trifluoromethyl, they are on other than adjacent carbon atoms.

The compounds of Formula I are prepared in accordance with the following reaction scheme:

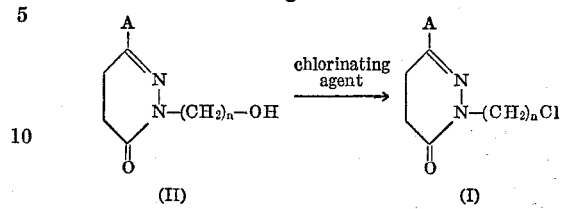

where $n$ and A and the proviso are as set out above.

Compounds of Formula I are prepared by treating 2-(ω-hydroxyalkyl)-pyridazinones (II) with a chlorinating agent in the conventional manner. The preferred chlorinating agents are thionyl chloride, phosphorus trichloride; pentachloride, and the like, especially thionyl chloride. The reaction may be carried out in excess chlorinating agent or in a suitable inert organic solvent, for example, benzene, hexane, dichloromethane, chloroform, etc. Although the temperature of the reaction is not critical, it is preferred that it be carried out at the reflux temperature of the system. The product is readily recovered by conventional techniques, e.g., evaporation.

Compounds of Formula II are prepared in accordance with the following process:

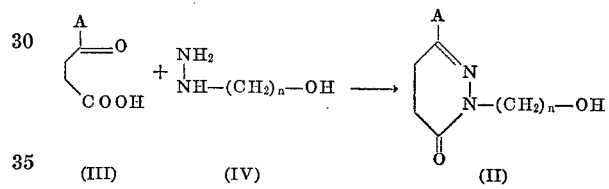

where $n$ and A and the proviso are as set out above.

The compounds of Formula II are prepared by condensing γ-ketobutyric acids of Formula III with ω-hydrazinoalkanols of Formula IV in a conventional manner. For example, the condensation may be carried out by treating a compound of Formula III and a compound of Formula IV at temperatures of from about 60° to 150° C. Preferably, the condensation is carried out in an inert solvent, e.g., toluene, at reflux temperatures, in the presence of an acid catalyst, such as an arylsulfonic acid, e.g., para-toluene sulfonic acid monohydrate. It is also preferred that the water formed during the reaction be removed, for example, by selecting a solvent which forms an azeotrope with water but is water immiscible, thereby permitting use of a Dean-Stark tube to remove the water from the reaction system. While compounds of Formula III, theoretically, react with compounds of Formula IV in a molar ratio of 1:1 to form the corresponding compounds of Formula II, it is preferred that the condensation be carried out using an excess of the compound of Formula IV, e.g., a 10 to 100 mole percent excess of the compound of Formula IV. The final product is recovered by conventional techniques, e.g., evaporation and recrystallization.

Certain of the compounds of Formulas III and IV are known and can be prepared by methods described in the literature. The compounds of Formulas III and IV not known can be prepared from known starting materials by methods analogous to those described in the literature for the preparation of known compounds.

The compounds of Formula I are useful because they are intermediates in the preparation of 1,5-diazabicyclo[4.3.0]nonanes, 1,5-diazabicyclo decanes and 1,5-diazacyclononanes which possess pharmacological activity in animals. The preparation of the 1,5-diazabicyclo[4.3.1] decanes and their use as anti-depressants are described in the aforementioned U.S. Pat. No. 3,517,004, issued June 23, 1970; and the preparation of 1,5-diazabicyclo[4.3.0] nonanes and 1,5-diazacyclononanes, their use as anti-depressants and the use of 1,5-diazabicyclo[4.3.0]nonanes as analgesics are described in U.S. Pat. 3,497,513, issued Feb. 24, 1970.

EXAMPLE 1

2-(3-chloropropyl)-6-phenyl-4,5-dihydropyridazin(2H)-3-one

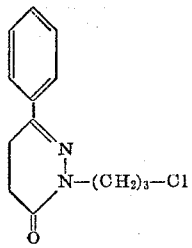

Step A.—2-(3-hydroxypropyl) - 6 - phenyl-4,5-dihydropyridazin(2H)-3-one: To a flask equipped with a condenser, Dean-Stark tube and stirrer is added 44.5 g. (0.25 mole) of 3-benzoylpropionic acid, 27 g. (0.3 mole) of 3-hydrazinopropanol, 1 g. of p-toluenesulfonic acid and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from benzene-pentane (1:2) to obtain 2-(3-hydroxypropyl) - 6 - phenyl-4,5-dihydropyridazin(2H)-3-one, M.P. 65°–68° C.

Step B.—2-(3-chloropropyl) - 6 - phenyl-4,5-dihydropyridazin(2H)-3-one: To a flask equipped with a stirrer, condenser and dropping funnel is added 45.0 g. (0.20 mole) of 2-(3-hydroxypropyl) - 6 - phenyl-4,5-dihydropyridazin(2H)-3-one and 500 ml. of dry chloroform. While stirring the mixture at room temperature, 21.3 ml. (0.3 mole) of thionyl chloride is added and the resulting mixture refluxed overnight. The chloroform solution is then washed first with 10% aqueous sodium bicarbonate solution until the wash is alkaline and then with saturated aqueous sodium chloride solution and the combined washings extracted twice with chloroform. The combined chloroform layers are then dried with sodium sulfate, filtered and the filtrate evaporated in vacuo on a rotary evaporator to yield 2-(3-chloropropyl)-6-phenyl-4,5-dihydropyridazin(2H)-3-one.

EXAMPLE 2

2-(3-chloropropyl)-6-(p-chlorophenyl)-4,5-dihydropyridazin(2H)-3-one

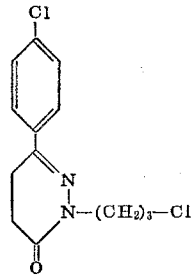

Step A.—2-(3-(hydroxypropyl) - 6 - (p-chlorophenyl)-4,5-dihydropyridazin(2H)-3-one: To a flask equipped with a condenser, Dean-Stark tube and stirrer is added 63.9 g. (0.30 mole) of 3-p-chlorobenzoylpropionic acid, 31.5 g. (0.35 mole) of 3-hydrozinopropanol and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from chloroform-pentane (1:2) to obtain 2-(3-hydroxypropyl) - 6 - (p-chlorophenyl)-4,5-dihydropyridazin(2H)-3-one, M.P. 128°–132° C.

Step B.—2-(3-chloropropyl) - 6 - (p-chlorophenyl)-4,5-dihydropyridazin(2H)-3-one: Following the procedure of Example 1B and using 2-(3-hydroxypropyl)-6-(p-chlorophenyl)-4,5-dihydropyridazin(2H)-3-one in place of 2-(3-hydroxypropyl) - 6 - phenyl-4,5-dihydropyridazin(2H)-3-one, there is obtained 2-(3-chloropropyl) - 6 - (p-chlorophenyl)-4,5-dihydropyridazin(2H)-3-one.

EXAMPLE 3

6-(p-chlorophenyl)-2-(2-chloroethyl)-4,5-dihydropyridazin(2H)-3-one

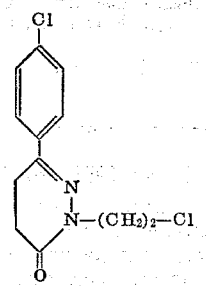

Following the procedure of Example 2A but using 2-hydrazinoethanol in place of the 3-hydrazinopropanol, there is obtained 6-(p-chlorophenyl)-2-(2-hydroxyethyl)-4,5-dihydropyridazin(2H)-3-one; M.P. 120.5°–122.5° C., from methanol-water (1:1).

Using 6-(p-chlorophenyl) - 2 - (2-hydroxyethyl)-4,5-dihydropyridazin(2H)-3-one in place of 2-(3-hydroxypropyl)-6-phenyl-4,5-dihydropyridazin(2H)-3-one in the procedure of Example 1B, there is obtained 2-(2-chloroethyl)-6-(p - chlorophenyl)-4,5-dihydropyridazin(2H)-3-one.

EXAMPLE 4

2-(4-chlorobutyl)-6-(p-chlorophenyl)-4,5-dihydropyridazin(2H)-3-one

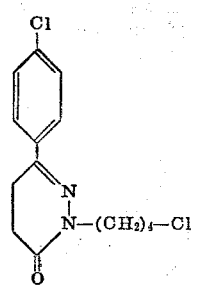

Following the procedure of Example 2A but using 4-hydrazinobutanol in place of the 3-hydrazinopropanol, there is obtained 6-(p-chlorophenyl)-2-(4-hydroxybutyl)-4,5 - dihydropyridazin(2H) - 3 - one; M.P. 102°–104° C. from methanol-water (1:1).

When 6-(p-chlorophenyl)-2-(4-hydroxybutyl)-4,5-dihydropyridazin(2H)-3-one is used in place of the 2-(3-hydroxypropyl) - 6-phenyl-4,5-dihydropyridazin(2H)-3-one in the procedure of Example 1B, there is obtained 2-(4-chlorobutyl) - 6 - (p-chlorophenyl)-4,5-dihydropyridazin (2H)-3-one.

EXAMPLE 5

2-(3-chloropropyl)-6-(p-fluorophenyl)-4,5-dihydropyridazin(2H)-3-one

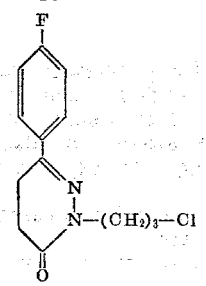

Following the procedure of Example 1A but using 3-(p-fluorobenzoyl)-propionic acid in place of the 3-benzoyl-propionic acid, there is obtained 6-(p-fluorophenyl)-2-(3-hydroxypropyl) - 4,5 - dihydropyridazin(2H)-3-one, M.P. 105°–106° C., crystallized from methylene chloride-ether (1:1).

Following the procedure of Example 1B, but using 6-(p-fluorophenyl) - 2-(3-hydroxypropyl)-4,5-dihydropyridazin(2H)-3-one in place of the 2-(3-hydroxypropyl)-6-phenyl-4,5-dihydropyridazin(2H)-3-one, there is obtained 2 - (3 - chloropropyl)-6-(p-fluorophenyl)-4,5-dihydropyridazin(2H)-3-one.

EXAMPLE 6

2-(3-chloropropyl)-6-(3,4-dichlorophenyl)-4,5-dihydropyridazin(2H)-3-one

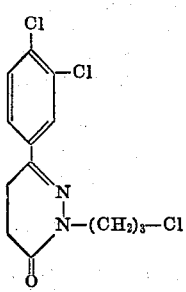

Following the procedure of Example 1A but using 3-(3,4-dichlorobenzoyl)-propionic acid in place of the benzoylpropionic acid, there is obtained 6-(3,4-dichlorophenyl) - 2 - (3-hydroxypropyl)-4,5-dihydropyridazin(2H)-3-one; M.P. 86°–87° C., crystallized (1:1) ether-pentane.

Following the procedure of Example 1B, but using 6-(3,4 - dichlorophenyl)-2-(3-hydroxypropyl)-4,5-dihydropyridazin(2H)-3-one in place of the 2-(3-hydroxypropyl)-6 - phenyl - 4,5 - dihydropyridazin(2H)-3-one, there is obtained 2 - (3 - chloropropyl)-6-(3,4-dichlorophenyl)-4,5-dihydropyridazin(2H)-3-one.

EXAMPLE 7

2-(2-chloroethyl)-6-(3,4-dichlorophenyl-4,5-dihydropyridazin(2H)-3-one

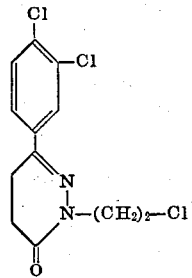

Following the procedure of Example 1A but using 3-(3,4-dichlorobenzoyl)-propionic acid and 2-hydrazino-ethanol in place of the 3-benzoyl-propionic acid and 3-hydrazinopropanol, respectively, there is obtained 6-(3,4-dichlorophenyl) - 2 - (2-hydroxyethyl)-4,5-dihydropyridazin(2H)-3-one; M.P. 92°–94° C., crystallized from toluene.

Following the procedure of Example 1B, but using 6-(3,4 - dichlorophenyl) - 2 - (2-hydroxyethyl)-4,5-dihydropyridazin(2H)-3-one in place of the 2-(3-hydroxypropyl) - 6-phenyl-4,5-dihydropyridazin(2H)-3-one, there is obtained 2-(2-chloroethyl)-6-(3,4-dichlorophenyl)-4,5-dihydropyridazin(2H)-3-one.

EXAMPLE 8

2-(4-chlorobutyl)-6-(3,4-dichlorophenyl)-4,5-dihydropyridazin(2H)-3-one

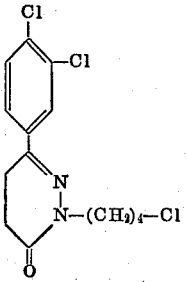

Following the procedure of Example 1A but using 3-(3,4-dichlorobenzoyl)- propionic acid and 4-hydrazino-butanol in place of the 3-benzoyl-propionic acid and 3-hydrazinopropanol, respectively, there is obtained 6-(3,4-dichlorophenyl) - 2 - (4-hydroxybutyl)-4,5-dihydropyridazin(2H)-3-one; M.P. 111°–113° C., crystallized from methanol-water (1:1).

Following the procedure of Example 1B, but using 6-(3,4 - dichlorophenyl) - 2-(4-hydroxybutyl)-4,5-dihydropyridazin(2H)-3-one in place of the 2-(3-hydroxypropyl)-6-phenyl-4,5-dihydropyridazine(2H)-3-one, there is obtained 2-(4-chlorobutyl)-6-(3,4-dichlorophenyl)-4,5-dihydropyridazin(2H)-3-one.

EXAMPLE 9

2-(3-chloropropyl)-6-(p-methoxyphenyl)-4,5-dihydropyridazin(2H)-3-one

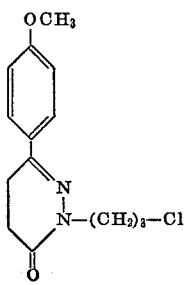

Step A.—2 - (3-hydroxypropyl)-6-(p-methoxyphenyl)-4,5-dihydropyridazin(2H)-3-one: To a flask equipped with a condenser, Dean-Stark tube and stirrer is added 20.8 g. (0.10 mole) of 3-p-methoxybenzoylpropionic acid, 13.5 g. (0.15 mole) of 3-hydrazinopropanol and 250 ml. of toluene. The mixture is stirred and refluxed until water ceases to separate in the Dean-Stark tube. The solvent is then removed in vacuo on a rotary evaporator to yield an oil which solidified on standing. The resulting solid material is crystallized from ether-pentane (1:1) to obtain 2-(3-hydroxypropyl) - 6 - (p-methoxyphenyl)-4,5-dihydropyridazin(2H)-3-one, M.P. 72°–75° C.

Step B.—2 - (3-chloropropyl)-6-(p-methoxyphenyl)-4,5-dihydropyridazin(2H)-3-one

To a flask equipped with a stirrer, condenser and dropping funnel is added 25.0 g. (0.10 mole) of 2-(3-hydroxypropyl) - 6 - (p-methoxyphenyl) - 4,5 - dihydropyridazin (2H)-3-one and 250 ml. of dry chloroform. While stirring the mixture at room temperature, 10.7 ml. (0.15 mole) of thionyl chloride is added and the resulting mixture refluxed overnight. The chloroform solution is then washed first with 10% aqueous sodium bicarbonate solution until the wash is alkaline and then with saturated aqueous sodium chloride solution and the combined washings extracted twice with chloroform. The combined chloroform layers are then dried with sodium sulfate, filtered and the filtrate evaporated in vacuo on a rotary evaporator to yield 2-(3-chloropropyl) - 6 - (p-methoxyphenyl)-4,5-dihydropyridazin(2H)-3-one.

EXAMPLE 10

2-(4-chlorobutyl)-6-(p-methoxyphenyl)-4,5-dihydropyridazin(2H)-3-one

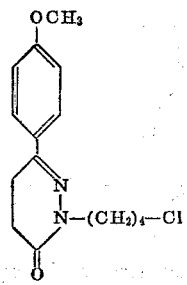

Following the procedure of Example 9A but using 4-hydrazinobutanol in place of the 3-hydrazinopropanol, there is obtained 2 - (4 - hydroxybutyl)-6-(p-methoxyphenyl)-4,5-dihydropyridazin(2H)-3-one; M.P. 55°–58° C. from etherpentane (1:1).

When 3-(p-toluoyl)propionic acid,
3-(4-trifluoromethylbenzoyl)propionic acid,
3-(3,4-methylenedioxybenzoyl)propionic acid,
3-(2-furoyl)propionic acid or
3-picolinoylpropionic acid is used in place of 3-(4-methoxybenzoyl)propionic acid in the above process, there is obtained 2-(4-hydroxybutyl)-6-(p-tolyl)-4,5-dihydropyridazin(2H)-3-one,
2-(4-hydroxybutyl)-6-(4-trifluoromethylphenyl)-4,5-dihydropyridazin(2H)-3-one,
2-(4-hydroxybutyl)-6-(3,4-methylenedioxyphenyl)-4,5-dihydropyridazin(2H)-3-one,
2-(4-hydroxybutyl)-6-(2-furyl)-4,5-dihydropyridazin(2H)-3-one or
2-(4-hydroxybutyl)-6-(2-pyridyl)-4,5-dihydropyridazin(2H)-3-one, respectively.

Following the procedure of Example 9B, but using 2-(4-hydroxybutyl) - 6 - (p-methoxyphenyl)-4,5-dihydropyridazin(2H)-3-one in place of the 2-(3-hydroxypropyl)-6-(p-methoxyphenyl) - 4,5 - dihydropyridazin(2H)-3-one, there is obtained 2-(4-chlorobutyl)-6-(p-methoxyphenyl)-4,5-dihydropyridazin(2H)-3-one.

When 2-(4-hydroxybutyl)-6-(p-tolyl)-4,5-dihydropyridazin(2H)-3-one,
2-(4-hydroxybutyl)-6-(4-trifluoromethylphenyl)-4,5-dihydropyridazin(2H)-3-one,
2-(4-hydroxybutyl)-6-(3,4-methylenedioxyphenyl)-4,5-dihydropyridazin(2H)-3-one,
2-(4-hydroxybutyl)-6-(2-furyl)-4,5-dihydropyridazin(2H)-3-one or
2-(4-hydroxybutyl)-6-(2-pyridyl)-4,5-dihydropyridazin(2H)-3-one is used in place of 2 - (4 - hydroxybutyl)-6-(4-methoxyphenyl)-4,5-dihydropyridazin(2H)-3-one in the above process, there is obtained 2-(4-chlorobutyl)-6-(p-tolyl)-4,5-dihydropyridazin(2H)-3-one,
2-(4-chlorobutyl)-6-(4-trifluoromethylphenyl)-4,5-dihydropyridazin(2H)-3-one,
2-(4-chlorobutyl)-6-(3,4-methylenedioxyphenyl)-4,5-dihydropyridazin(2H)-3-one,
2-(4-chlorobutyl)-6-(2-furyl)-4,5-dihydropyridazin(2H)-3-one or
2-(4-chlorobutyl)-6-(2-pyridyl)-4,5-dihydropyridazin(2H)-3-one.

EXAMPLE 11

2-(3-chloropropyl)-6-(2-thienyl)-4,5-dihydropyridazin(2H)-3-one

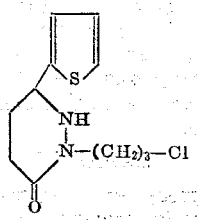

Following the procedure of Example 1A, but using 3-(2-thenoyl)propionic acid in place of the 3-benzoylpropionic acid there is obtained 2-(3-hydroxypropyl)-6-(2-thienyl)-4,5-dihydropyridazin(2H)-3-one; M.P. 78°–80° C., crystallized from ethyl acetate.

When 3-(2-thenoyl)propionic acid is treated with 2-hydrazinoethanol or 4-hydrazinobutanol in place of 3-hydrazinopropanol in the above process, 2-(2-hydroxyethyl) - 6 - (2-thienyl)-4,5-dihydropyridazin(2H)-3-one (M.P. 101°–104° C.) or 2 - (4 - hydroxybutyl) - 6 - (2-thienyl) - 4,5 - dihydropyridazin(2H - 3 - one (M.P. 78°–80° C.) respectively is obtained on crystallization from (1:1) ether-pentane.

Following the procedure of Example 1B, but using 2-(3-hydroxypropyl) - 6 - (2-thienyl)-4,5-dihydropyridazin(2H)-3-one in place of the 2-(3-hydroxypropyl)-6-phenyl-4,5-dihydropyridazin(2H)-3-one, there is obtained 2-(3-chloropropyl)-6-(2-thienyl)-4,5-dihydropyridazon(2H)-3-one.

When 2 - (2-hydroxyethyl)-6-(2-thienyl)-4,5-dihydropyridazin(2H)-3-one is used in place of 2-(3-hydroxypropyl)-6-(2-thienyl)-4,5-dihydropyridazin(2H)-3-one in the above process, there is obtained 2-(2-chloroethyl)-6-(2-thienyl) - 4,5 - dihydropyridazin(2H)-3-one or 2-(4-chlorobutyl) - 6 - (2-thienyl)-4,5-dihydropyridazin(2H)-3-one, respectively.

What is claimed is:

1. A compound of the formula

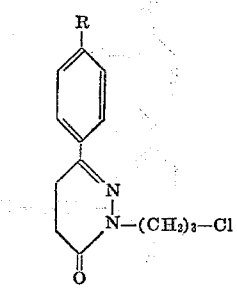

where R represents hydrogen, chloro or lower alkoxy.

References Cited

UNITED STATES PATENTS 2,963,477   12/1960   Druey et al. _____ 260—250 A

NICHOLAS S. RIZZO, Primary Examiner

U.S. Cl. X.R.

424—250